(12) United States Patent
Xu et al.

(10) Patent No.: US 10,079,918 B2
(45) Date of Patent: Sep. 18, 2018

(54) BLOCK CODING SCHEME FOR PHY DATA UNIT TRANSMISSION

(71) Applicant: Marvell World Trade Ltd., St. Michael (BB)

(72) Inventors: Mingguang Xu, San Jose, CA (US);
Yakun Sun, Sunnyvale, CA (US);
Hongyuan Zhang, Fremont, CA (US);
Lei Wang, San Diego, CA (US);
Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 172 days.

(21) Appl. No.: 15/046,215

(22) Filed: Feb. 17, 2016

(65) Prior Publication Data

US 2016/0241682 A1    Aug. 18, 2016

Related U.S. Application Data

(60) Provisional application No. 62/259,205, filed on Nov. 24, 2015, provisional application No. 62/117,353, filed on Feb. 17, 2015.

(51) Int. Cl.
*H04L 29/06* (2006.01)
*H04L 27/26* (2006.01)
(Continued)

(52) U.S. Cl.
CPC ............ *H04L 69/22* (2013.01); *H04L 1/0041* (2013.01); *H04L 1/0068* (2013.01);
(Continued)

(58) Field of Classification Search
None
See application file for complete search history.

(56) References Cited

U.S. PATENT DOCUMENTS 7,046,746 B1    5/2006    Keaney et al.
7,145,955 B1    12/2006    Bohnke et al.
(Continued)

FOREIGN PATENT DOCUMENTS

WO    WO-2006/025996    3/2006
WO    WO-2008/046163    4/2008
(Continued)

OTHER PUBLICATIONS

International Search Report and Written Opinion in PCT Application No. PCT/US2016/018274, dated May 3, 2016 (19 pages).
(Continued)

*Primary Examiner* — Vinncelas Louis

(57) ABSTRACT

A communication device receives a plurality of information bits and determines a maximum number of information bits that can be encoded such that, after the plurality of information bits have been encoded using i) a forward error correction scheme, and ii) a block coding scheme, the block coded bits fit within a single orthogonal frequency division multiplex (OFDM) symbol. The maximum number of information bits is based on a number of repetitions of coded information bits by the block coding scheme, and a number of block coded bits for the maximum number of information bits is less than a number of data tones of the single OFDM symbol. The communication device encodes the plurality of information bits using the forward error correction scheme and the block coding scheme to generate block coded bits, and generates a physical layer data unit to include the block coded bits in the single OFDM symbol.

20 Claims, 8 Drawing Sheets

(51) Int. Cl.
  *H04L 1/00*     (2006.01)
  *H04L 5/00*     (2006.01)
  *H04L 1/08*     (2006.01)

(52) U.S. Cl.
  CPC ...... *H04L 27/2601* (2013.01); *H04L 27/2602* (2013.01); *H04L 1/0013* (2013.01); *H04L 1/0025* (2013.01); *H04L 1/0056* (2013.01); *H04L 1/08* (2013.01); *H04L 5/0007* (2013.01)

(56) References Cited

U.S. PATENT DOCUMENTS

| | | | |
|---|---|---|---|
| 7,418,042 | B2 | 8/2008 | Choi et al. |
| 8,073,065 | B2 | 12/2011 | Miyoshi et al. |
| 8,331,419 | B2 | 12/2012 | Zhang et al. |
| 8,397,126 | B2 | 3/2013 | Xu et al. |
| 8,494,089 | B2 | 7/2013 | Aoki et al. |
| 8,539,287 | B2 | 9/2013 | Lee et al. |
| 8,873,652 | B2 | 5/2014 | Srinivasa et al. |
| 8,867,653 | B2 | 10/2014 | Zhang et al. |
| 8,885,740 | B2 | 11/2014 | Zhang et al. |
| 8,948,283 | B2 | 2/2015 | Zhang |
| 9,130,727 | B2 | 9/2015 | Zhang et al. |
| 9,178,745 | B2 | 11/2015 | Zhang et al. |
| 9,264,287 | B2 | 2/2016 | Srinivasa et al. |
| 2002/0010893 | A1* | 1/2002 | Kim ...................... H04B 1/707 714/790 |
| 2002/0085659 | A1 | 7/2002 | Kim et al. |
| 2002/0188908 | A1 | 12/2002 | Yonge et al. |
| 2004/0081131 | A1 | 4/2004 | Walton et al. |
| 2006/0034384 | A1 | 2/2006 | Lee |
| 2009/0034635 | A1 | 2/2009 | Golitschek Edler Von Elbwart et al. |
| 2009/0086699 | A1 | 4/2009 | Niu et al. |
| 2009/0196163 | A1 | 8/2009 | Du |
| 2010/0034323 | A1 | 2/2010 | Stoye |
| 2010/0046656 | A1 | 2/2010 | van Nee et al. |
| 2010/0091673 | A1 | 4/2010 | Sawai et al. |
| 2010/0091675 | A1 | 4/2010 | Sawai |
| 2010/0103920 | A1 | 4/2010 | Damnjanovic et al. |
| 2010/0189187 | A1 | 7/2010 | Kim et al. |
| 2010/0260159 | A1 | 10/2010 | Zhang et al. |
| 2010/0309834 | A1 | 12/2010 | Fischer et al. |
| 2011/0002219 | A1 | 1/2011 | Kim et al. |
| 2011/0026639 | A1 | 2/2011 | Rouquette-Leveil et al. |
| 2011/0032875 | A1 | 2/2011 | Erceg et al. |
| 2011/0122846 | A1 | 5/2011 | Yu et al. |
| 2012/0201316 | A1 | 8/2012 | Zhang et al. |
| 2012/0294268 | A1 | 11/2012 | Lee et al. |
| 2012/0294294 | A1 | 11/2012 | Zhang |
| 2013/0121244 | A1 | 5/2013 | Vermani et al. |
| 2013/0202001 | A1 | 8/2013 | Zhang |
| 2014/0029681 | A1* | 1/2014 | Zhang ................... H04L 1/0046 375/260 |
| 2015/0030101 | A1 | 1/2015 | Zhang et al. |
| 2015/0117227 | A1 | 4/2015 | Zhang et al. |
| 2016/0241682 | A1* | 8/2016 | Xu ......................... H04L 69/22 |

FOREIGN PATENT DOCUMENTS

| | | |
|---|---|---|
| WO | WO-2009/059229 | 5/2009 |
| WO | WO-2009/084926 | 7/2009 |
| WO | WO-2012/122119 | 9/2012 |

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

Hiertz et al., "The IEEE 802.11 Universe," IEEE Communications Magazine, pp. 62-70, (Jan. 2010).

IEEE Std 802.11ac/D7.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-456 (Sep. 2013).

Chun et al., "Legacy Support on HEW frame structure," doc: IEEE 11-13/1057r0, *The Institute of Electrical and Electronics Engineers, Inc.*, pp. 1-8 (Sep. 2013).

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).

Lee et al., "TGaf PHY proposal," *The Institute of Electrical and Electronics Engineers*, doc. No. IEEE 802.11-12/0809r5, pp. 1-43 (Jul. 10, 2012).

IEEE P802.15.4m/D3, May 2013 IEEE Standard for Local metropolitan area networks—"Part 15.4: Low Rate Wireless Personal Area Networks (LR-WPANs)", Amendment 6: TV White Space Between 54 MHz and 862 MHz Physical Layer, Excerpt, 2 pages (May 2013).

IEEE Std 802.11ah™ m/D1.0 "Draft STANDARD for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-394 (Oct. 2013).

IEEE P802.11ah™/D1.3 "Draft STANDARD for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-466 (Apr. 2014).

Yu et al., "Coverage extension for IEEE802.11ah," *The Institute of Electrical and Electronics Engineers*, doc. No. IEEE 802.11-11/0035r1, pp. 1-10 (Jan. 2011).

Taghavi et al., "Introductory Submission for TGah", doc. No. IEEE 802.11-11/0062r0, *Institute for Electrical and Electronics Engineers*, pp. 1-5 (Jan. 14, 2011).

De Vegt, "Potential Compromise for 802.11ah Use Case Document", Institute of Electrical and Electronics Engineers, doc. No. IEEE 802.11-11/0457r0, pp. 1-27 (Mar. 2011).

Zhang et al., "11ah Data Transmission Flow," *The Institute of Electrical and Electronics Engineers*, doc. No. IEEE 802.11-11/1484r1, pp. 1-15 (Nov. 2011).

Park, "Proposed Specification Framework for TGah", *The Institute of Electrical and Electronics Engineers*, doc. No. IEEE 802.11-11/1137r6, pp. 1-13 (Mar. 2012).

Park, "Proposed Specification Framework for TGah D9.x", *The Institute of Electrical and Electronics Engineers*, doc. No. IEEE 802.11-yyxxxxr0, pp. 1-30 (Jul. 2012).

Vermani et al. "Preamble Format for 1 MHz," *The Institute of Electrical and Electronics Engineers*, doc. No. IEEE 802.11-11/1482r2, pp. 1-30 (Nov. 2011).

Zhang et al., "1MHz Waveform in Wider BW", *The Institute of Electrical and Electronics Engineers*, doc. No. IEEE 802.11-12/0309r1, pp. 1-10 (Mar. 2012).

Vermani et al. "Spec Framework Text for PHY Numerology," *The Institute of Electrical and Electronics Engineers*, doc. No. IEEE 802.11-11/1311r0, pp. 1-5 (Sep. 2011).

Park, "Proposed Specification Framework for TGah", *The Institute of Electrical and Electronics Engineers*, doc. No. IEEE 802.11-11/1137r11, pp. 1-36 (Sep. 2012).

(56) References Cited

OTHER PUBLICATIONS

Park, "Specification Framework for TGah," *The Institute of Electrical and Electronics Engineers*, doc. No. IEEE 802.11-11/1137r13, pp. 1-58 (Jan. 14, 2013).
Zhang et al., "Beamforming Feedback for Single Stream," *The Institute of Electrical and Electronics Engineers*, doc. No. IEEE 802.11-12/1312r0, pp. 1-22 (Nov. 12, 2012).
Shao, "Channel Selection for 802.11ah," doc.: IEEE 802.11-12/0816r0, pp. 1-11 (Jul. 2012).
Park, "Proposed Specification Framework for TGah", *The Institute of Electrical and Electronics Engineers*, doc. No. IEEE 802.11--yy/xxxxr05, pp. 1-12 (Jan. 2012).
Park et al., "Low Power Capability Support for 802.11ah," doc. No. IEEE 802.11-11/0060r1, *The Institute for Electrical and Electronics Engineers*, 7 pages (Jan. 17, 2011).
International Preliminary Report on Patentability in International Patent Application No. PCT/US2016/018274, dated Aug. 31, 2017 (13 pages).
Communication pursuant to Article 94(3) EPC in European Patent Application No. 16 707 335.2-1219, dated Jun. 4, 2018 (8 pages).

\* cited by examiner

| MCS | Modulation | Coding Rate |
|---|---|---|
| 0 | BPSK | 1/2 |
| 1 | QPSK | 1/2 |
| 2 | QPSK | 3/4 |
| 3 | 16-QAM | 1/2 |
| 4 | 16-QAM | 3/4 |
| 5 | 64-QAM | 2/3 |
| 6 | 64-QAM | 3/4 |
| 7 | 64-QAM | 5/6 |
| 8 | 256-QAM | 3/4 |
| 9 | 256-QAM | 7/8 |

*FIG. 3*

BLOCK CODING SCHEME FOR PHY DATA UNIT TRANSMISSION

CROSS-REFERENCES TO RELATED APPLICATIONS

This disclosure claims the benefit of U.S. Provisional Patent Application No. 62/117,353, entitled "Methods of Codeword Construction for Lower MCS Levels in 1 lax," filed on Feb. 17, 2015, and U.S. Provisional Patent Application No. 62/259,205, entitled "Methods of Codeword Construction for Lower MCS Levels in 11ax," filed on Nov. 24, 2015, the disclosures of each of which are incorporated herein by reference in their entireties.

FIELD OF THE DISCLOSURE

The present disclosure relates generally to communication networks and, more particularly, to encoding methods in a wireless communication system.

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method for generating a physical layer (PHY) data unit for transmission by a communication device via a communication channel includes: receiving, by the communication device, a plurality of information bits to be included in the PHY data unit; determining, by the communication device, a maximum number of information bits that can be encoded such that, after the plurality of information bits have been encoded using i) a forward error correction scheme to obtain coded information bits, and ii) a block coding scheme to obtain block coded bits from the coded information bits, the block coded bits fit within a single orthogonal frequency division multiplex (OFDM) symbol on the communication channel, wherein the maximum number of information bits is based on a number of repetitions of the coded information bits by the block coding scheme, and a number of the block coded bits for the maximum number of information bits is less than a number of data tones of the single OFDM symbol; encoding, by the communication device, the plurality of information bits with the maximum number of information bits using the forward error correction scheme and the block coding scheme to generate the block coded bits; and generating, by the communication device, the PHY data unit to include the block coded bits in the single OFDM symbol.

In another embodiment, a communication device comprises a network interface device having one or more integrated circuits. The one or more integrated circuits are configured to: receive a plurality of information bits to be included in the PHY data unit; determine a maximum number of information bits that can be encoded such that, after the plurality of information bits have been encoded using i) a forward error correction scheme to obtain coded information bits, and ii) a block coding scheme to obtain block coded bits from the coded information bits, the block coded bits fit within a single orthogonal frequency division multiplex (OFDM) symbol on the communication channel, wherein the maximum number of information bits is based on a number of repetitions of the coded information bits by the block coding scheme, and a number of the block coded bits for the maximum number of information bits is less than a number of data tones of the single OFDM symbol; encode the plurality of information bits with the maximum number of information bits using the forward error correction scheme and the block coding scheme to generate the block coded bits; and generate the PHY data unit to include the block coded bits in the single OFDM symbol.

In yet another embodiment, a method for generating a physical layer (PHY) data unit for transmission by a communication device via a communication channel includes: receiving, by the communication device, a plurality of information bits to be included in the PHY data unit; determining, by the communication device, a maximum number of information bits that can be encoded such that, after the plurality of information bits have been encoded using i) a forward error correction scheme to obtain coded information bits, ii) a block coding scheme to obtain block coded bits from the coded information bits with a base number of repetitions, and iii) a puncturing scheme to obtain punctured bits from the block coded bits, the punctured bits fit within a single orthogonal frequency division multiplex (OFDM) symbol on the communication channel, wherein the maximum number of information bits is based on a number of repetitions of the coded information bits by the block coding scheme, and at least some of the plurality of information bits corresponding to the punctured bits have a different number of repetitions; encoding, by the communication device, the plurality of information bits with the maximum number of information bits using the forward error correction scheme, the block coding scheme, and the puncturing scheme to generate the punctured bits; and generating, by the communication device, the PHY data unit to include the punctured bits in the single OFDM symbol.

In still another embodiment, a communication device comprises a network interface device having one or more integrated circuits. The one or more integrated circuits are configured to: receive a plurality of information bits to be included in the PHY data unit; determine a maximum number of information bits that can be encoded such that, after the plurality of information bits have been encoded using i) a forward error correction scheme to obtain coded information bits, ii) a block coding scheme to obtain block coded bits from the coded information bits with a base number of repetitions, and iii) a puncturing scheme to obtain punctured bits from the block coded bits, the punctured bits fit within a single orthogonal frequency division multiplex (OFDM) symbol on the communication channel, wherein the maximum number of information bits is based on a number of repetitions of the coded information bits by the block coding scheme, and at least some of the plurality of information bits corresponding to the punctured bits have a different number of repetitions; encode the plurality of information bits with the maximum number of information bits using the forward error correction scheme, the block coding scheme, and the puncturing scheme to generate the punctured bits; and generate the PHY data unit to include the punctured bits in the single OFDM symbol.

BRIEF DESCRIPTION OF THE DRAWINGS

FIG. 3 is an example modulation and coding scheme (MCS) table, according to an embodiment.

DETAILED DESCRIPTION

In embodiments described below, a wireless network device such as an access point (AP) of a wireless local area network (WLAN) transmits data streams to one or more client stations. According to an embodiment, a modulation and coding scheme (MCS)—used for transmission to a client station—is selected from a suitable set of modulation and coding schemes, for example from a modulation and coding table defined by a communication standard. In an embodiment, if a certain MCS for a particular system configuration results in violation of one or more constraints associated with certain parsing and/or coding techniques, then this MCS is excluded from consideration for at least this particular system configuration. However, in some embodiments, it is beneficial to use some system configurations at which the constraints are not satisfied, for example in order to utilize desirable data rates associated with these system configurations. Accordingly, in some embodiments, parsing rules and/or coding techniques are altered to accommodate at least some system configurations for which the constraints are not satisfied. In various embodiments, unused data tones of an OFDM symbol are left empty, filled with repeated coded information bits, or filled with additional pilot tones, direct current (DC) tones, or edge tones to fill an OFDM symbol. In other embodiments, one or more repeated coded information bits are punctured to fill an OFDM symbol.

Figure 1:
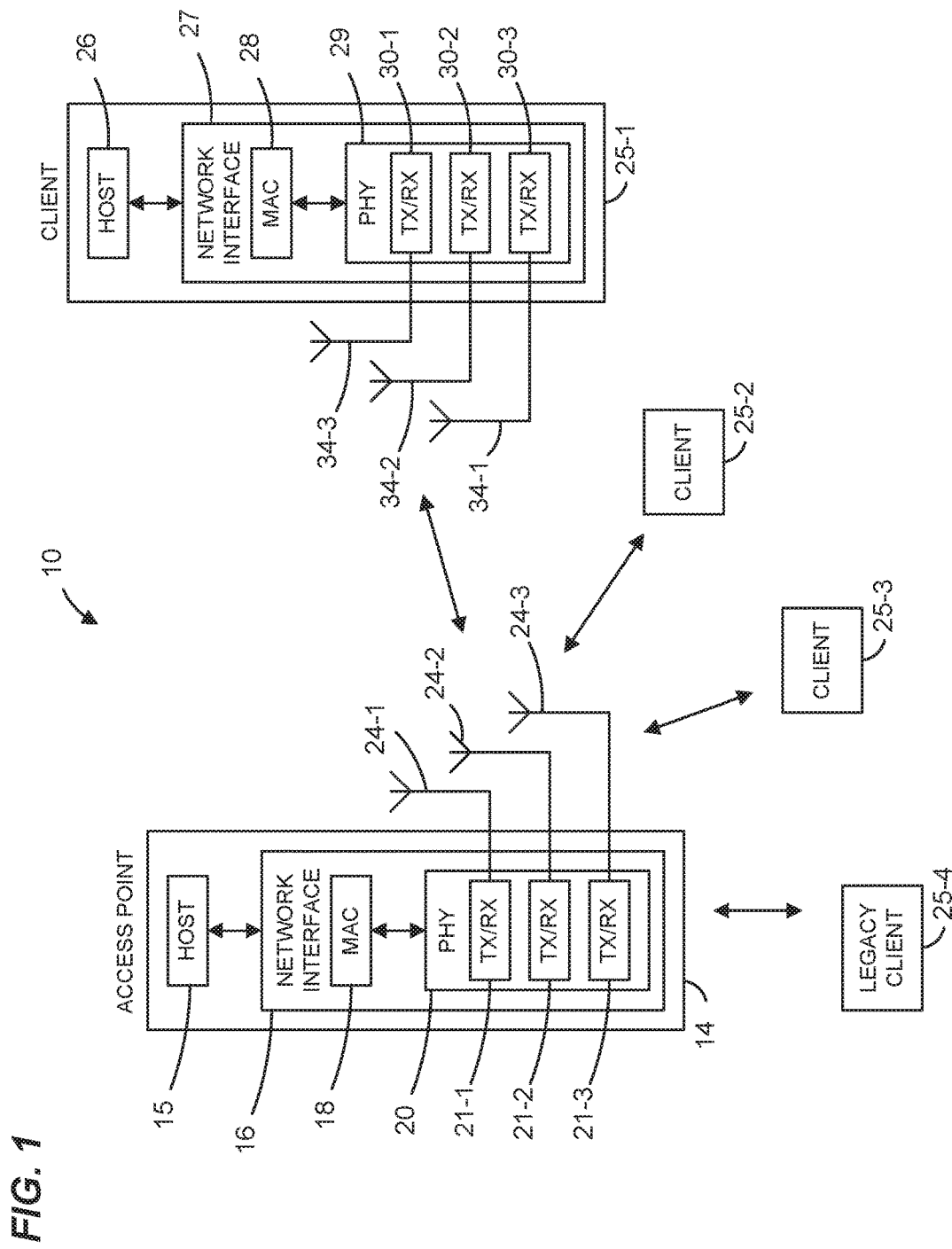
FIG. 1 is a block diagram of an example wireless local area network (WLAN), according to an embodiment.

FIG. 1 is a block diagram of an example wireless local area network (WLAN) 10, according to an embodiment. An AP 14 includes a host processor 15 coupled to a network interface 16. In an embodiment, the network interface 16 includes one or more integrated circuits (ICs) configured to operate as discussed below. The network interface 16 includes a medium access control (MAC) processor 18 and a physical layer (PHY) processor 20. The PHY processor 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized. In an embodiment, the MAC processor 18 is implemented on at least a first IC, and the PHY processor 20 is implemented on at least a second IC. In an embodiment, at least a portion of the MAC processor 18 and at least a portion of the PHY processor 20 are implemented on a single IC. In an embodiment, the PHY processor 20 scrambles an MPDU (e.g., a PHY service data unit) based on a scramble seed.

In various embodiments, the MAC processor 18 and the PHY processor 20 are configured to operate according to a first communication protocol (e.g., a High Efficiency Wi-Fi, HEW, HE, or 802.11ax communication protocol). In some embodiments, the MAC processor 18 and the PHY processor 20 are also configured to operate according to a second communication protocol (e.g., according to the IEEE 802.11ac Standard). In yet another embodiment, the MAC processor 18 and the PHY processor 20 are additionally configured to operate according to the second communication protocol, a third communication protocol, and/or a fourth communication protocol (e.g., according to the IEEE 802.11a Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to at least one of the second communication protocol, the third communication protocol, and/or the fourth communication protocol (referred to herein as a "legacy client station").

The client station 25-1 includes a host processor 26 coupled to a network interface 27. In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized. In an embodiment, the MAC processor 28 is implemented on at least a first IC, and the PHY processor 29 is implemented on at least a second IC. In an embodiment, at least a portion of the MAC processor 28 and at least a portion of the PHY processor 29 are implemented on a single IC.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol, and/or the fourth communication protocol.

In an embodiment, one or both of the client stations 25-2 and 25-3, has a structure that is the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the MAC processor 18 and the PHY processor 20 of the AP 14 are configured to generate data units conforming to the first communication protocol and having formats described herein. In an embodiment, the MAC processor 18 is configured to implement MAC layer functions, including MAC layer functions of the first communication protocol. In an embodiment, the PHY processor 20 is configured to implement PHY functions, including PHY functions of the first communication protocol. For example, in an embodiment, the MAC processor 18 is configured to generate MAC layer data units such as MPDUs, MAC control frames, etc., and provide the MAC layer data units to the PHY processor 20. In an embodiment, the PHY processor 20 is configured to receive MAC layer data units from the MAC processor 18 and encapsulate the MAC layer data units to generate PHY data units such as PHY protocol data units (PPDUs) for transmission via the antennas 24. Similarly, in an embodiment, the PHY processor 20 is configured to receive PHY data units that were received via the antennas 24, and extract MAC layer data units encapsulated within the PHY data units. In an embodiment, the PHY processor 20 provides the extracted MAC layer data units to the MAC processor 18, which processes the MAC layer data units.

The transceiver(s) 21 is/are configured to transmit the generated data units via the antenna(s) 24. Similarly, the transceiver(s) 21 is/are configured to receive data units via the antenna(s) 24. The MAC processor 18 and the PHY processor 20 of the AP 14 are configured to process received data units conforming to the first communication protocol and having formats described hereinafter and to determine that such data units conform to the first communication protocol, according to various embodiments.

In various embodiments, the MAC processor 28 and the PHY processor 29 of the client device 25-1 are configured to generate data units conforming to the first communication protocol and having formats described herein. In an embodiment, the MAC processor 28 is configured to implement MAC layer functions, including MAC layer functions of the first communication protocol. In an embodiment, the PHY processor 29 is configured to implement PHY functions, including PHY functions of the first communication protocol. For example, in an embodiment, the MAC processor 28 is configured to generate MAC layer data units such as MPDUs, MAC control frames, etc., and provide the MAC layer data units to the PHY processor 29. In an embodiment, the PHY processor 29 is configured to receive MAC layer data units from the MAC processor 28 and encapsulate the MAC layer data units to generate PHY data units such as PPDUs for transmission via the antennas 34. Similarly, in an embodiment, the PHY processor 29 is configured to receive PHY data units that were received via the antennas 34, and extract MAC layer data units encapsulated within the PHY data units. In an embodiment, the PHY processor 29 provides the extracted MAC layer data units to the MAC processor 28, which processes the MAC layer data units.

The transceiver(s) 30 is/are configured to transmit the generated data units via the antenna(s) 34. Similarly, the transceiver(s) 30 is/are configured to receive data units via the antenna(s) 34. The MAC processor 28 and the PHY processor 29 of the client device 25-1 are configured to process received data units conforming to the first communication protocol and having formats described hereinafter and to determine that such data units conform to the first communication protocol, according to various embodiments.

In various embodiments, the PHY processors 20 and/or 29 are configured to utilize an MCS that might otherwise be excluded from the first communication protocol or excluded from a configuration of the WLAN 10. In an embodiment, symbols transmitted by the AP 14 or client station 25 are generated according to a range extension coding scheme that provides increased redundancy of symbols or information bits encoded within the symbols. The redundancy increases the likelihood of the symbols being successfully decoded by a device that receives the symbols, particularly in areas with reduced SNR. An amount of redundancy needed to mitigate the reduced SNR generally depends on a delay channel spread (e.g. for an outdoor communication channel), other signals that interfere with the symbols, and/or other factors. In an embodiment, the HEW communication protocol defines a regular mode and a range extension mode. The regular mode is generally used with communication channels characterized by shorter channel delay spreads (e.g., indoor communication channels) or generally higher SNR values, while the range extension mode is generally used with communication channels characterized by relatively longer channel delay spreads (e.g., outdoor communication channels) or generally lower SNR values in an embodiment. In an embodiment, a regular coding scheme is used in the regular mode, and a range extension coding scheme is used in the range extension mode. In another embodiment, the range extension coding scheme is an MCS that is selectable for operation in suitable environments (e.g., areas with reduced SNR) without changing a mode of the AP 14 or client station 25.

In various embodiments, the range extension mode corresponds to a lowest data rate modulation and coding scheme (MCS) of the regular mode and introduces redundancy or repetition of bits into at least some fields of the data unit or repetition of symbols to further reduce the data rate. For example, the range extension mode introduces redundancy into the data portion and/or the non-legacy signal field of a range extension mode data unit or repetition of symbols according to one or more range extension coding schemes described below, in various embodiments and/or scenarios. As an example, according to an embodiment, regular mode data units are generated according a regular coding scheme. In various embodiments, the regular coding scheme is a modulation and coding scheme (MCS) selected from a set of MCSs, such as MCS0 (binary phase shift keying (BPSK) modulation and coding rate of 1/2) to MCS9 (quadrature amplitude modulation (QAM) and coding rate of 5/6), with higher order MCSs corresponding to higher data rates. Range extension mode data units, in one such embodiment, are generated using a range extension coding scheme, such as a modulation and coding as defined by MCS0 and with added bit repetition, block encoding, or symbol repetition that further reduce the data rate.

Figure 2:
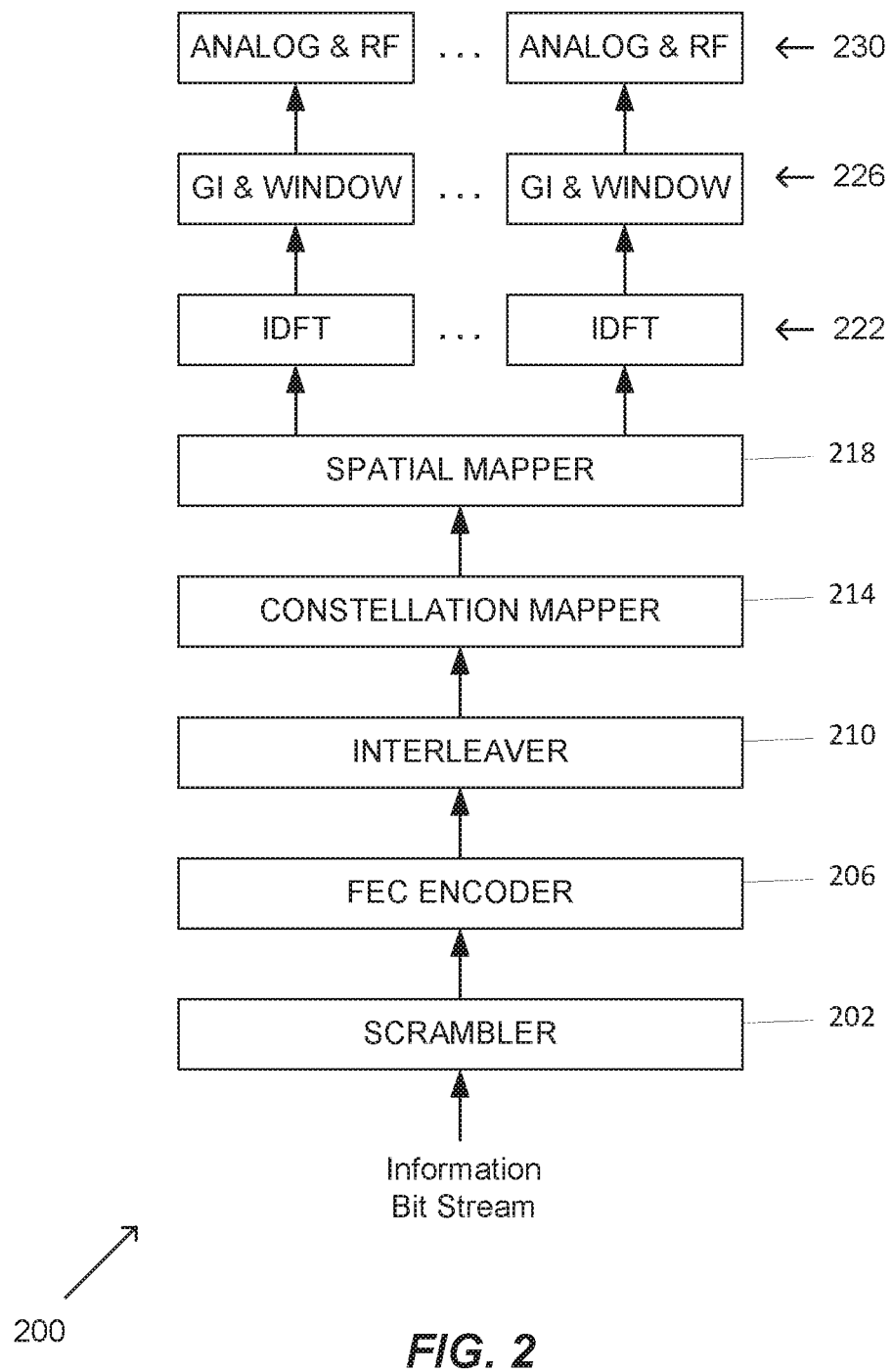
FIG. 2 is a block diagram illustrating an example physical layer (PHY) processor for generating regular mode data units using the regular coding scheme, according to an embodiment.

FIG. 2 is a block diagram illustrating an example PHY processor 200 for generating regular mode data units using the regular coding scheme, according to an embodiment. Referring to FIG. 1, the AP 14 and the client station 25-1, in one embodiment, each include a PHY processor such as the PHY processor 200. The PHY processor 200 includes a scrambler 202 that generally scrambles an information bit stream to reduce the occurrence of long sequences of ones or zeros. An FEC encoder 206 encodes scrambled information bits to generate encoded information bits. In one embodiment, the FEC encoder 206 includes a binary convolutional code (BCC) encoder. In another embodiment, the FEC encoder 206 includes a BCC encoder followed by a puncturing block. In yet another embodiment, the FEC encoder 206 includes a low density parity check (LDPC) encoder. An interleaver 210 receives the encoded information bits and interleaves the bits (i.e., changes the order of the bits) to prevent long sequences of adjacent noisy bits from entering a decoder at the receiver. A constellation mapper 214 maps the interleaved sequence of bits to constellation points corresponding to different subcarriers of an OFDM symbol. More specifically, for each spatial stream, the constellation mapper 214 translates every bit sequence of length $\log_2(M)$ into one of M constellation points for one or more spatial streams.

A spatial mapper 218 receives the constellation points corresponding to the one or more spatial streams and maps the spatial streams to transmit chains. In various embodiments, spatial mapping includes one or more of: 1) direct mapping, in which constellation points from each space-time stream are mapped directly onto transmit chains (i.e., one-to-one mapping); 2) spatial expansion, in which vectors of constellation point from all space-time streams are expanded via matrix multiplication to produce inputs to the transmit chains; and 3) beamforming, in which each vector of constellation points from all of the space-time streams is multiplied by a matrix of steering vectors to produce inputs to the transmit chains.

Each output of the spatial mapper 218 corresponds to a transmit chain, and each output of the spatial mapper 218 is operated on by an inverse discrete Fourier transform (IDFT) processor 222, e.g., an inverse fast Fourier transform processor, that converts a block of constellation points to a time-domain signal. In embodiments or situations in which the PHY processor 200 operates to generate data units for transmission via multiple spatial streams, IDFT processor 222 inserts a cyclic shift into all but one of the spatial streams to prevent unintentional beamforming. The output of the IDFT processor 222 is provided to a guard interval (GI) insertion and windowing unit 226 that prepends, to an OFDM symbol, a circular extension of the OFDM symbol and smooths the edges of each symbol to increase spectral decay. The output of the GI insertion and windowing unit 226 is provided to an analog and radio frequency (RF) unit 230 that converts the OFDM symbols to an analog signal and upconverts the analog signal to RF frequency for transmission. The signals are transmitted in a 20 MHz, a 40 MHz, an 80 MHz, a 120 MHz, a 160 MHz bandwidth channel, or 320 MHz bandwidth channel, in various embodiments and/or scenarios. In other embodiments, other suitable channel bandwidths are utilized.

In various embodiments, the range extension mode corresponds to a lowest data rate modulation and coding scheme (MCS) of the regular mode and introduces redundancy or repetition of bits into at least some fields of the data unit or repetition of symbols to further reduce the data rate. For example, the range extension mode introduces redundancy into the data portion and/or the non-legacy signal field of a range extension mode data unit according to one or more range extension coding schemes described below, in various embodiments and/or scenarios. As an example, according to an embodiment, regular mode data units are generated according a regular coding scheme. In various embodiments, the regular coding scheme is a modulation and coding scheme (MCS) selected from a set of MCSs, such as MCS0 (binary phase shift keying (BPSK) modulation and coding rate of 1/2) to MCS9 (quadrature amplitude modulation (QAM) and coding rate of 5/6) as shown in FIG. 3, with higher order MCSs corresponding to higher data rates. Range extension mode data units, in one such embodiment, are generated using a range extension coding scheme, such as a modulation and coding as defined by MCS0 and with added bit repetition or block encoding that further reduce the data rate.

Figure 4:
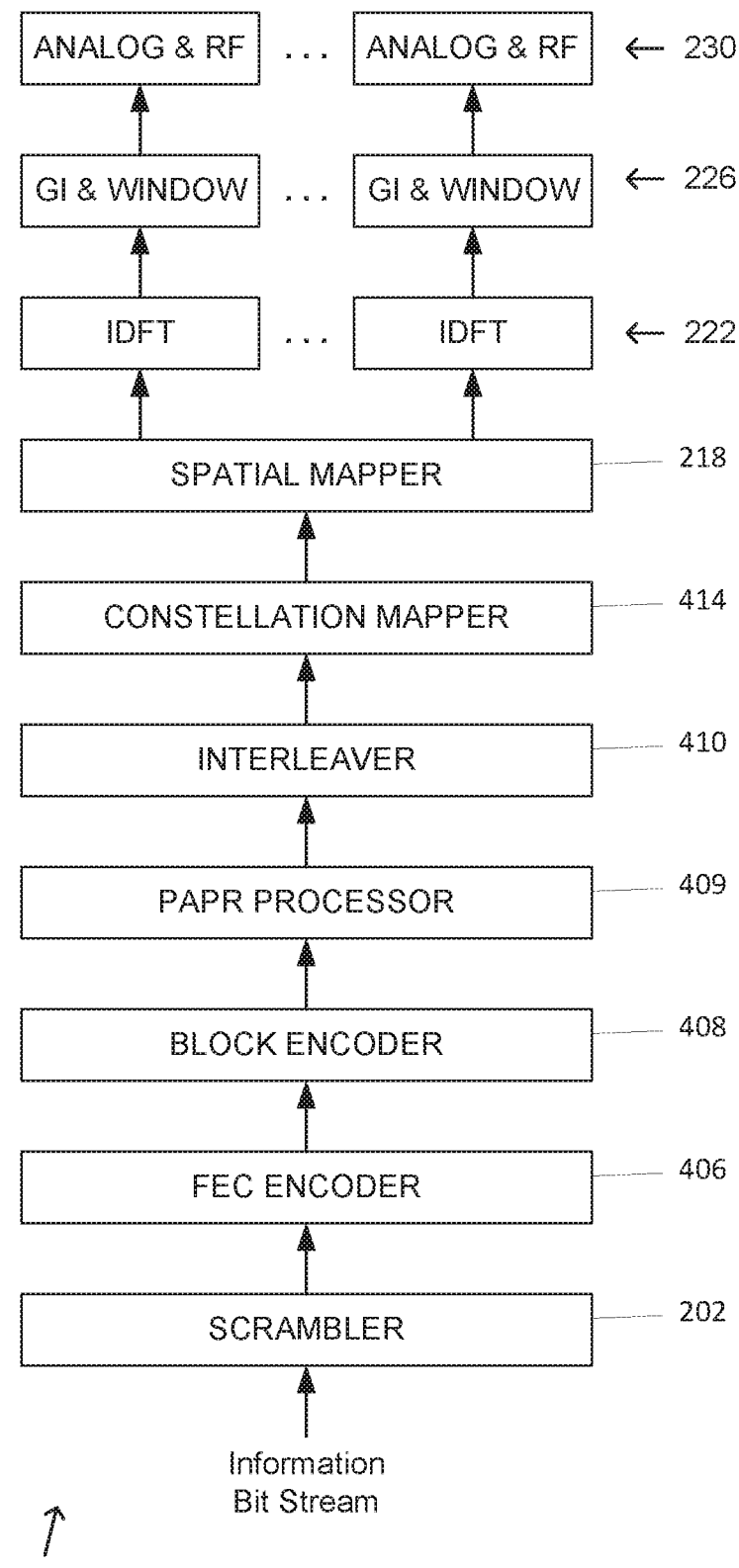
FIG. 4 is a block diagram of an example PHY processor for generating range extension mode data units using a range extension coding scheme, according to an embodiment.

FIG. 4 is a block diagram of an example PHY processor 400 for generating range extension mode data units using a range extension coding scheme, according to an embodiment. In some embodiments, the PHY processor 400 generates signal fields and/or data fields of range extension mode data units. Referring to FIG. 1, the AP 14 and the client station 25-1, in one embodiment, each include a PHY processor such as the PHY processor 400.

The PHY processor 400 is similar to the PHY processor 200 of FIG. 2 except that the PHY processor 400 includes an FEC encoder 406, a block encoder 408, a peak to average power (PAPR) processor 409, and an interleaver 410, and a constellation mapper 414, in an embodiment. Accordingly, in this embodiment, information bits are first scrambled by scrambler 202, encoded by the FEC encoder 406 using a forward error correction scheme, and the FEC coded bits are then replicated or otherwise block encoded by the block encoder 408 using a block coding scheme. In an embodiment, processing by the FEC encoder 406 is performed continuously over the entire field being generated (e.g., the entire data portion, the entire signal field, etc.). Accordingly, in this embodiment, information bits corresponding to the field being generated are first encoded by the FEC encoder 406 and the BCC coded bits are then partitioned into blocks of a specified size (e.g., 6 bits, 12 bits, 58 bits, 59 bits, or any other suitable number of bits). In various embodiments, a number of tail bits are typically added to each field of a data unit for proper operation of the FEC encoder 406, e.g., to ensure that the BCC encoder, after having encoded each field, is brought back to zero state. In one embodiment, for example, six tail bits are inserted at the end of the data portion before the data portion is provided to the FEC encoder 406. Similarly, in the case of a signal field, tail bits are inserted at the end of the signal field before the signal field is provided to the FEC encoder 406, according to an embodiment.

In an embodiment, the block encoder 408 reads incoming coded information bits one block at a time and block encodes the coded information bits to generate block encoded bits. For example, in an embodiment, the block encoder 408 generates an integer number of copies of each block (or each bit in a block) and outputs the block encoded bits for further processing by the PAPR processor 409. In some embodiments, each block of scrambled information bits contains a number of information bits that, after having been encoded by the FEC encoder 406 and the block encoder 408, fit within the data tones of a single OFDM symbol using BPSK modulation, according to an embodiment. As an example, in one embodiment, the block encoder 408 generates two copies (2× repetition) of each block of coded information bits to be included in an OFDM symbol having a number of data tones $N_{SD}$ equal to 234. In this embodiment, the PHY processor 400 determines a number of information bits $N_{DBPS}$ (data or information bits per OFDM symbol) for the FEC encoder 406 so that after encoding by the FEC encoder 406 and block encoding by the block encoder 408, a number of block encoded bits $N_{CBPS}$ is less than or equal to the number of data tones $N_{SD}$. In this embodiment, a block of 58 information bits is scrambled by the scrambler 202 and encoded by the FEC encoder 406 at a coding rate of 1/2 to generate 116 coded information bits. The block encoder 408 encodes the 116 coded information bits (2× repetition) to obtain 232 block encoded bits, which is less than or equal to the number of data tones $N_{SD}$ equal to 234. As another example, in another embodiment, the FEC encoder 406 encodes 39 information bits per OFDM symbol using the coding rate of 1/2 to generate 78 BCC coded bits and provides the BCC coded bits to the block encoder 408, which generates three copies to obtain 234 bits that fit within the 234 data tones of the OFDM symbol.

According to an embodiment, the effective coding rate corresponding to a combination of the coding performed by the block encoder 408 and coding performed by the FEC encoder 406 is the product of the two coding rates. For example, in an embodiment in which the block encoder 408 utilizes 2× repetition (or coding rate of 1/2) and the FEC encoder 406 utilizes a coding rate of 1/2, the resulting effective coding rate is equal to 1/4. As a result of the reduced coding rate compared to the coding rate used to generate a similar regular mode data unit, the data rate in the range extension mode is effectively reduced by a factor corresponding to the number the coding rate applied by the block encoder 408 (e.g., a factor of 2, a factor of 4, etc.), according to an embodiment.

In one embodiment, the block encoder 408 utilizes a "block level" repetition scheme in which each block of n bits is repeated m consecutive times. As an example, if m is equal to 4 (4× repetitions), the block encoder 408 generates a sequence [C, C, C, C], where C is a block of n bits, according to an embodiment. In another embodiment, the block encoder 408 utilizes a "bit level" repetition scheme in which each incoming bit is repeated m consecutive times. In this case, in an embodiment, if m is equal to 4 (4× repetitions), the block encoder 408 generates the sequence [b1 b1 b1 b1 b2 b2 b2 b2 b3 b3 b3 b3 . . . ], where b1 is the first bit in the block of bits, b2 is the second bit, and so on. In some embodiments, the block encoder 408 punctures one or more of the block encoded bits using a block coding scheme so that the block encoded bits fit within the data tones of a single OFDM symbol using BPSK modulation.

The PAPR processor 409 flips the bits in some or all repeated blocks to reduce or eliminate the occurrence of the same bit sequences at different frequency locations in an OFDM symbol thereby reducing the peak to average power ratio of the output signal, in an embodiment. In general, bit flipping involves changing the bit value of zero to the bit value of one and changing the bit vale of one to the bit value of zero. According to an embodiment, the PAPR processor 409 implements bit flipping using an "exclusive or" (XOR) operation with a suitable bit flipping sequence s. For example, in an embodiment utilizing 2× repetition of a block of coded bits, if a block of 12 coded bits to be included in an OFDM symbols is denoted as $[C_1, C_2, \ldots C_{12}]$, then a possible bit sequence at the output of the PAPR processor 409, according to an embodiment, is $[[C_1, C_2, \ldots C_{12}], [C_1, C_2, \ldots C_{12}] \oplus s]$, where s=[1 0 0 0 0 1 0 1 0 1 1 1] or another suitable value and $\oplus$ indicates the exclusive or operation. In general, any suitable combination of blocks with bits flipped and blocks with bits not flipped can be used.

In some embodiments, the PAPR processor 409 is omitted. In some embodiments, the PAPR processor 409 is combined with the block encoder 408. In other words, the block encoder 408 performs the bit flipping in combination with the repetition of the bits, in an embodiment. In an embodiment, for example, the FEC encoder 406 outputs an integer number K of encoded bits: $[C_1, C_2, \ldots C_K]$. In this embodiment, the block encoder 408 outputs block coded bits $C_{out}$, with $$C_{out} = [[C_1, \ldots C_K], [C_1, \ldots C_K] \oplus s_1, [C_1, \ldots C_K] \oplus s_2, \ldots [C_1, \ldots C_K] \oplus s_{n-1}] \quad \text{(Equation 1)}$$

where $\oplus$ indicates an "exclusive or" operation and bit sequences $s_1, s_2, \ldots s_n$ are suitable bit flipping sequences.

Similar to the interleaver 210 of FIG. 2, in various embodiments, the interleaver 410 changes the order of bits in order to provide diversity gain and reduce the chance that consecutive bits in a data stream will become corrupted in the transmission channel. In some embodiments, however, the block encoder 408 provides sufficient diversity gain and the interleaver 410 is omitted. Similar to the constellation mapper 214 of FIG. 2, in various embodiments, the constellation mapper 414 maps the interleaved sequence of bits to constellation points corresponding to different subcarriers of an OFDM symbol.

In some embodiments, block encoded bits in the data portion of a range extension mode data unit are padded (i.e., a number of bits of a known value is added to the information bits) so that the data unit occupies an integer number of OFDM symbols, for example. Referring to FIG. 1, in some embodiments, padding is implemented in the PHY processor 20 or PHY processor 29. In some such embodiments, the number of padding bits is determined according to padding equations, as described herein. In general, these padding equations involve computing a number of padding bits based, in part, on a number of information bits per OFDM symbol ($N_{DBPS}$), a number of data tones $N_{SD}$, and/or a base number of repetitions n performed by the block encoder 408. In some embodiments, the constellation mapper 414 inserts padding bits or padding symbols to fill an integer number of OFDM symbols. In other embodiments, the block encoder 408 inserts padding bits to fill an integer number of OFDM symbols.

Figure 5A:
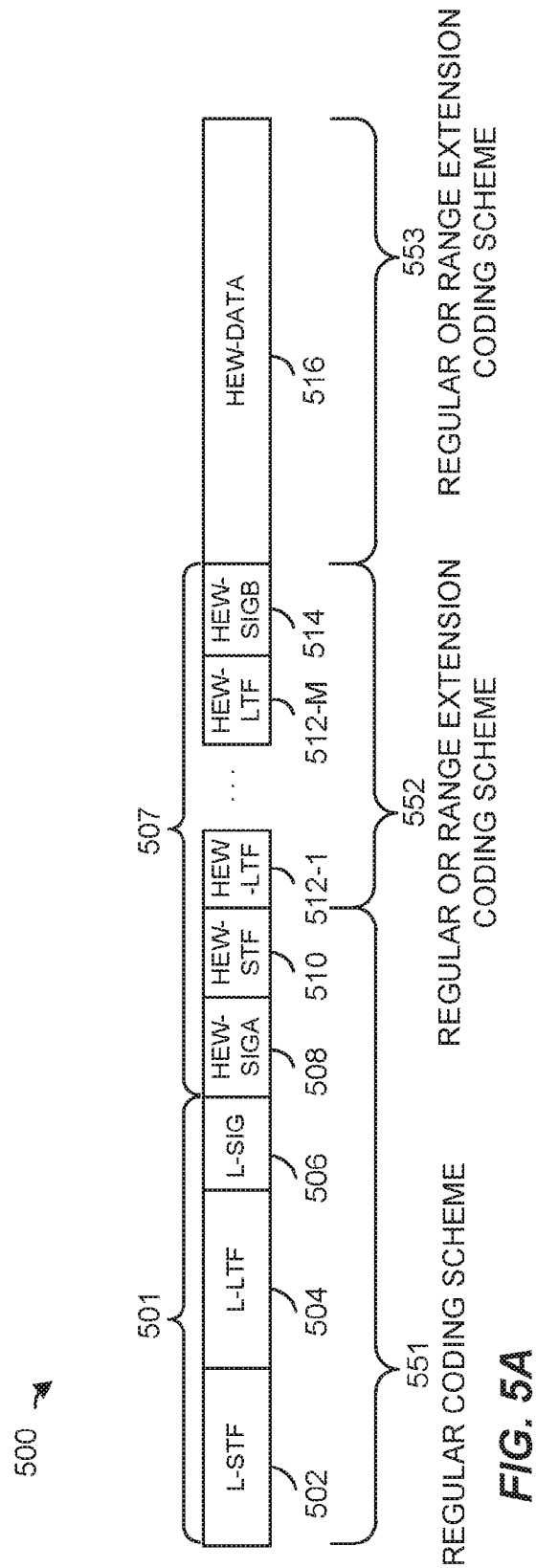
FIG. 5A is a diagram of an orthogonal frequency division multiplex (OFDM) data unit, according to an embodiment.

FIG. 5A is a diagram of an OFDM data unit 500 that the AP 14 is configured to transmit to the client station 25 via orthogonal frequency division multiplexing (OFDM) modulation, according to an embodiment. In an embodiment, the client station 25 is also configured to transmit the data unit 500 to the AP 14. In an embodiment, the data unit 500 conforms to the first communication protocol and occupies a 20 Megahertz (MHz) band. Data units that conform to the first communication protocol similar to the data unit 500 may occupy other suitable bandwidth such as 40 MHz, 80 MHz, 160 MHz, 320 MHz, 640 MHz, for example, or other suitable bandwidths, in other embodiments. The data unit 500 includes a legacy preamble 501 having a legacy short training field (L-STF) 502, generally used for packet detection, initial synchronization, and automatic gain control, etc., a legacy long training field (L-LTF) 504, generally used for channel estimation and fine synchronization, and a legacy signal field (L-SIG) 506, used to carry certain physical layer (PHY) parameters with the data unit 500, such as modulation type and coding rate used to transmit the data unit, for example.

Figure 5B:
FIG. 5B is a diagram of an example data field of the OFDM data unit, according to an embodiment.

The data unit 500 also includes a non-legacy preamble 507 having a HEW signal field (HEW-SIGA) 508, an HEW short training field (HEW-STF) 510, M HEW long training fields (HEW-LTFs) 512, where M is an integer, and a third HEW signal field (HEW-SIGB) 514. Each of the L-STF 502, the L-LTF 504, the L-SIG 506, the HEW-SIGA 508, the HEW-STF 510, the M HEW-LTFs 512, and the HEW-SIGB 514 comprises an integer number of one or more OFDM symbols. In some embodiments, the data unit 500 also includes a data portion 516. In other embodiments, the data unit 500 omits the data portion 516. FIG. 5B is a diagram of the example data portion 516 (not low density parity check encoded), which includes a service field, a scrambled physical layer service data unit (PSDU), tail bits, and padding bits, if needed.

In the embodiment of FIG. 5A, the data unit 500 includes one of each of the L-STF 502, the L-LTF 504, the L-SIG 506, and the HEW-SIGA 508. In other embodiments in which an OFDM data unit similar to the data unit 500 occupies a cumulative bandwidth other than 20 MHz, each of the L-STF 502, the L-LTF 504, the L-SIG 506, the HEW-SIGA 508 is repeated over a corresponding number of 20 MHz sub-bands of the whole bandwidth of the data unit, in an embodiment. For example, in an embodiment, the OFDM data unit occupies an 80 MHz bandwidth and, accordingly, includes four of each of the L-STF 502, the L-LTF 504, the L-SIG 506, the HEW-SIGA 508, in an embodiment. In some embodiments, the modulation of different 20 MHz sub-bands signals is rotated by different angles. For example, in one embodiment, a first sub-band is rotated 0-degrees, a second sub-band is rotated 90-degrees, a third sub-band is rotated 180-degrees, and a fourth sub-band is rotated 270-degrees. In other embodiments, different suitable rotations are utilized. The different phases of the 20 MHz sub-band signals result in reduced peak to average power ratio (PAPR) of OFDM symbols in the data unit 500, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HEW-STF, the HEW-LTFs, the HEW-SIGB and the HEW data portion occupy the corresponding whole bandwidth of the data unit.

The data unit 500 is encoded using one or more coding schemes, in various embodiments. The data unit 500 includes two or more portions, for example, a first portion 551, a second portion 552, and a third portion 553, in various embodiments. In an embodiment, the first portion 551 and the second portion 552 are encoded as a single portion (i.e., with a same coding scheme). In another embodiment, the second portion 552 and the third portion 553 are encoded as a single portion.

In general, the first portion 551 is encoded with the regular coding scheme (i.e., without repetition by the block encoder 408), for example, so that legacy devices (e.g., legacy client station 25-4) are able to decode at least a portion of the data unit 500. In an embodiment, the third portion 553 is encoded with the regular coding scheme. In this embodiment, the second portion 552 is also encoded with the regular coding scheme. In other embodiments, in the range extension mode for example, the third portion 553 is encoded using the range extension coding scheme (i.e., with repetition by the block encoder 408). In an embodiment, for example, where the range extension coding scheme is used for OFDM symbols of the data portion 516, the range and/or SNR at which successful decoding of PHY data units can be performed is generally improved (i.e., successful decoding at longer range and/or lower SNR) as compared to regular data units. In an embodiment, the second portion 552 is encoded using the regular coding scheme when the third portion 553 is encoded using the range extension coding scheme. In another embodiment, the second portion 552 is encoded with the range extension coding scheme when the third portion 553 is encoded using the range extension coding scheme.

Referring now to FIG. 4, the PHY processor 400 utilizes the range extension coding scheme to generate instances of the data unit 500 to be transmitted in a 20 MHz, a 40 MHz, an 80 MHz, a 120 MHz, a 160 MHz bandwidth channel, or 320 MHz bandwidth channel, in various embodiments and/or scenarios. In other embodiments, other suitable channel bandwidths are utilized. In some embodiments, the PHY processor 400 utilizes the range extension coding scheme to generate instances of the data unit 500 to be transmitted in a tone block within a communication channel, for example, an orthogonal frequency division multiple access (OFDMA) tone block.

In some embodiments or situations, configurations of the WLAN 10 corresponding to certain MCS/channel bandwidth/number of spatial streams combinations are not utilized for transmission. That is, in these embodiments, certain MCSs are disallowed for use with particular channel bandwidths and particular numbers of spatial streams, or, alternatively, certain MCSs are completely excluded from the set of allowed MCSs (e.g., from an MCS table). For instance, in one such embodiment, an MCS is not allowed for a particular channel bandwidth if the corresponding number of data bits per symbol ($N_{DBPS}$) is not an integer. This constraint is referred to herein as "integer $N_{DBPS}$ constraint". Generally, the number of coded bits in an OFDM symbol, in an embodiment, is determined by the number of data tones corresponding to the channel bandwidth being utilized, the constellation size determined by the MCS, and the number of spatial streams. The corresponding number of data bits (or information bits) in a data unit, according to an embodiment, is determined by the coding rate, also specified by the MCS. Accordingly, in an embodiment, the integer $N_{DBPS}$ constraint excludes (disallows) an MCS for a particular system configuration (or for all system configurations) if the number of data bits corresponding to the number of coded bits as determined by the coding rate specified by the particular MCS is not an integer. In some embodiments, the integer $N_{DBPS}$ constraint excludes at least some MCSs that correspond to low or lowest data rates for the respective system configurations.

Additionally, in some embodiments, a second constraint is that the number of information bits in data unit fits in an integer number of OFDM symbols after having been encoded. This constraint is referred to herein as "integer symbol constraint". For example, in one embodiment, the number of OFDM symbols in a data packet is signaled to a receiver (e.g., in a preamble portion of a data unit), and in this embodiment a receiver needs to operate on a corresponding integer number of OFDM symbols in order to properly decode the information bits. In some such embodiments, padding (i.e., addition of a certain number of padding bits) is utilized to ensure that the number of information bits corresponding to a data unit fits in an integer number of OFDM symbols.

As discussed above, the integer $N_{DBPS}$ constraint and/or the integer symbol constraint, alone or in combination, in some embodiments, lead to exclusions of certain system configurations that correspond to desirable low data rates (and, consequently, increased range). For example, in an embodiment using the first communication protocol, 2× repetition of coded bits using MCS0 (BPSK modulation, 1/2 coding rate) does not meet the integer symbol constraint because the number of data tones $N_{SD}$ is 234, which is not divisible by the effective coding rate of 1/4. More specifically, if $N_{DBPS}$ is equal to 58, then 232 block coded bits are generated as described above, which results in two unused tones. Alternatively, if $N_{DBPS}$ is equal to 59, then 236 block coded bits are generated, which requires two extra tones.

Accordingly, in some embodiments, certain parsing rules and/or encoding techniques are altered to allow an MCS (or a system configuration utilizing the MCS) even in situations in which the integer $N_{DBPS}$ constraint and/or the integer symbol constraint for the system configuration are not satisfied. If the number of data tones is $N_{SD}$, then using BPSK modulation, the number of coded bits per symbol $N_{CBPS}$ is equal to $N_{SD}$. For a base number of repetitions n by the block encoder 408, the nominal effective coding rate is equal to the coding rate R divided by the base number of repetitions n.

In some embodiments, the PHY processor 200 encodes a plurality of information bits with a maximum number of information bits using i) a forward error correction scheme to obtain coded information bits, and ii) a block coding scheme to obtain block coded bits from the coded information bits. In an embodiment, the PHY processor 200 determines the maximum number of data bits (or information bits) per symbol $N_{DBPS}$ according to:

$$N_{DBPS} = \left\lfloor \frac{N_{SD} \cdot R}{n} \right\rfloor = \left\lfloor \frac{N_{SD}}{2n} \right\rfloor \quad \text{(Equation 2)}$$

where $\lfloor \; \rfloor$ represents the integer floor function. The maximum number of data bits is based on the base number of repetitions of the coded information bits by the block coding scheme, in various embodiments. In one such embodiment, the data bits $N_{DBPS}$ are encoded by the FEC encoder 406 using the 1/2 rate (i.e., MCS0 where R=1/2) to obtain a number 2·$N_{DBPS}$ encoded bits. The 2·$N_{DBPS}$ encoded bits are repeated by the block encoder 408 to obtain the n repetitions. This results in a number of unused or "left-over" data tones $N_{LO}$. More specifically, the number of data tones $N_{SD}$ is greater than the number of block coded bits 2·n·$N_{DBPS}$, thus the number of left-over data tones $N_{LO}$ is computed as:

$$N_{LO} = N_{SD} - 2 \cdot n \cdot N_{DBPS} \quad \text{(Equation 3)}$$

In an embodiment, for example, a communication channel has a 20 MHz bandwidth, a number of data tones $N_{SD}$=234, and a base number of repetitions n=2. In this embodiment, the maximum number of data bits per symbol $N_{DBPS}$ is equal to the integer floor of 234/2×2=58 information bits. The FEC encoder 406 generates 116 coded information bits from the 58 information bits. The output $C_{out}$ from the PAPR processor 409 is given by $$C_{out} = [[C_1, C_2, \ldots C_{116}], [C_1, C_2, \ldots C_{116}] \oplus s_1] \quad \text{(Equation 4)}$$

where $\oplus$ indicates an "exclusive or" operation and $s_1$ is a suitable bit flipping sequence.

In an embodiment, the left-over data tones are left empty and the integer symbol constraint is relaxed. In another embodiment, the left-over data tones are used as pilot tones. For example, in an embodiment, the PHY processor 200 inserts a number of extra pilot tones equal to the number of left-over data tones $N_{LO}$. In yet another embodiment, the left-over data tones are used as direct current (DC) tones. In another embodiment, the left-over data tones are used as edge tones. In an embodiment, the constellation mapper 414 inserts the extra pilot tones, DC tones, and/or edge tones. In another embodiment, the left-over data tones are filled with padding bits or padding symbols. In an embodiment, the block encoder 408 inserts the padding bits. In another embodiment, the constellation mapper 414 inserts padding bits or padding symbols.

In some embodiments, the left-over data tones are positioned based on the use of the left-over data tones. In an embodiment, for example, the left-over data tones are used as DC tones and are positioned near a center of the bandwidth of the communication channel. In another embodiment, the left-over data tones are used as edge tones and are used near an outer edge of the bandwidth. In an embodiment, the position of the left-over data tones is predetermined, for example, set by an operator of the WLAN 10. In various embodiments, the positions of the left-over data tones are selected arbitrarily.

In some embodiments, the left-over data tones are used for providing an unequal coding rate to one or more bits of the OFDM symbol. In an embodiment, a number of encoded bits (e.g., output from the FEC encoder 406) equal to $N_{SD}$–2·n·$N_{DBPS}$ are each repeated once to fill the left-over data tones. As an example, in an embodiment using a 2× base repetition, 58 information bits ($N_{DBPS}$) are encoded to obtain 116 bits, which are then repeated twice to obtain 232 bits, while two encoded bits are repeated for a third time to obtain a total of 234 bits. In other embodiments, an integer number k of encoded bits are repeated multiple times to fill the OFDM symbol, where k is less than or equal to $N_{SD}$–2·n·$N_{DBPS}$. In an embodiment, the integer number k of encoded bits are repeated different numbers of times (e.g., a first encoded bit is repeated once and a second encoded bit is repeated twice). In an embodiment, the position of the encoded bits to be repeated is predetermined, for example, set by an operator of the WLAN 10. In other embodiments, the positions of the encoded bits to be repeated are selected arbitrarily.

In an embodiment, for example, a communication channel has a 20 MHz bandwidth, a number of data tones $N_{SD}$=234, and a base number of repetitions n=2. In this embodiment, the maximum number of data bits per symbol $N_{DBPS}$ is equal to the integer floor of 234/2×2=58 information bits. The FEC encoder 406 generates 116 coded information bits from the 58 information bits. The output $C_{out}$ from the PAPR processor 409 is given by:

$$C_{out} = [[C_1, C_2, \ldots C_{116}], [C_1, C_2, \ldots C_{116}] \oplus s_1, C_i, C_j] \quad \text{(Equation 5)}$$

where $\oplus$ indicates an "exclusive or" operation, $s_1$ is a suitable bit flipping sequence, and the indices i and j are selected from between 1 and 116. In some embodiments, the elements $C_i$ and $C_j$ are also bit flipped by a corresponding element of the bit flipping sequence $s_1$, for example, $C_i$ is replaced with $C_i \oplus s_{1,i}$ and $C_j$ is replaced with $C_j \oplus s_{1,j}$. In an embodiment, the indices i and j are equal to each other. In another embodiment, the indices i and j are not equal to each other.

Figure 6:
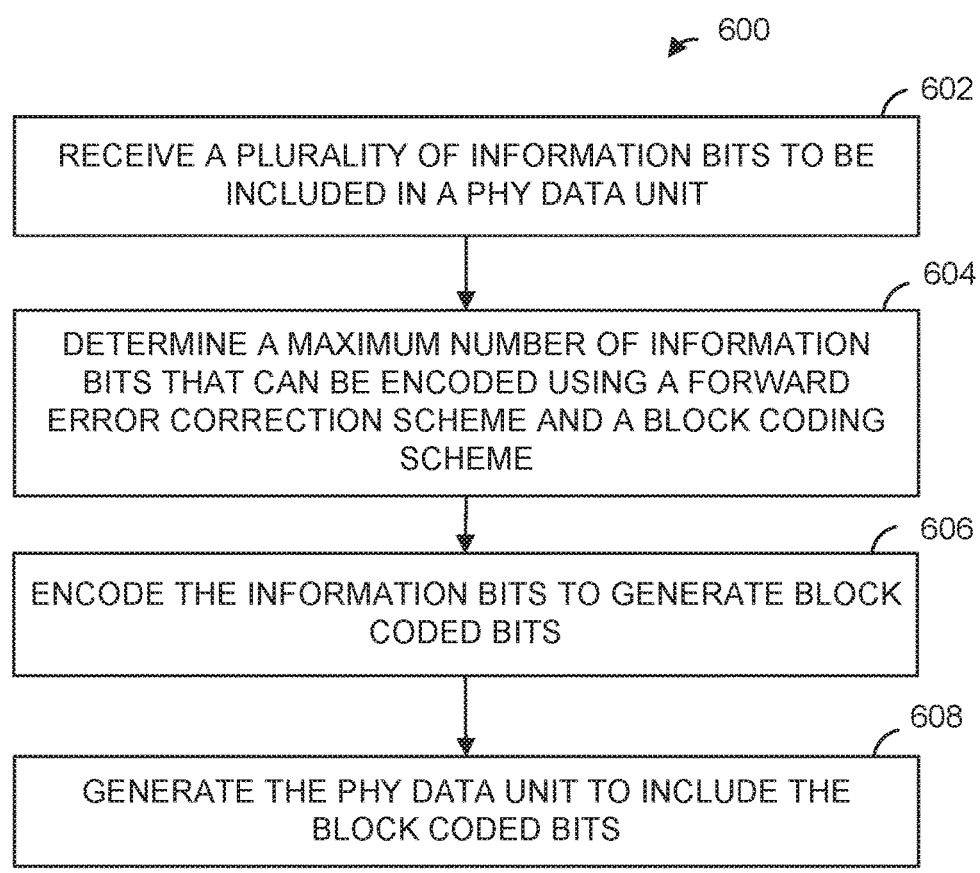
FIG. 6 is a flow diagram illustrating an example method for generating a PHY data unit for transmission by a communication device via a communication channel, according to an embodiment.

FIG. 6 is a flow diagram illustrating an example method 600 for generating a PHY data unit for transmission by a communication device via a communication channel, according to an embodiment. In an embodiment, the method 600 is implemented by a client station in the WLAN, according to an embodiment. With reference to FIG. 1, the method 600 is implemented by the network interface 27, in an embodiment. For example, in one such embodiment, the PHY processor 29 is configured to implement the method 600. With continued reference to FIG. 1, in yet another embodiment, the method 600 is implemented by the network interface 16 (e.g., the PHY processor 20). In other embodiments, the method 600 is implemented by other suitable network interfaces.

At block 602, a plurality of information bits to be included in the PHY data unit are received. In an embodiment, the plurality of information bits correspond to a signal field of the PHY data unit, for example, the HEW-LTF 512 field or HEW-SIGB field 514 of the data unit 500. In an embodiment, the plurality of information bits correspond to a data field of the PHY data unit, for example, the data field 516 of the data unit 500.

At block 604, a maximum number of information bits is determined where the maximum number can be encoded such that, after the plurality of information bits have been encoded using i) a forward error correction scheme to obtain coded information bits, and ii) a block coding scheme to obtain block coded bits from the coded information bits, the block coded bits fit within a single orthogonal frequency division multiplex (OFDM) symbol on the communication channel. The maximum number of information bits is based on a number of repetitions of the coded information bits by the block coding scheme, in an embodiment. A number of the block coded bits for the maximum number of information bits is less than a number of data tones of the single OFDM symbol, in an embodiment. In an embodiment, the maximum number of information bits is determined according to Equation 2 as described above.

At block 606, the plurality of information bits is encoded with the maximum number of information bits using the forward error correction scheme and the block coding scheme to generate the block coded bits.

At block 608, the PHY data unit is generated to include the block coded bits in the single OFDM symbol.

In some embodiments, a number of unused data tones of the single OFDM symbol is equal to a difference between the number of data tones of the single OFDM symbol and the number of the block coded bits for the maximum number of information bits. In an embodiment, the unused data tones are left empty. In other embodiments, the PHY processor 200 fills the number of unused bits with padded bits, edge tones, DC tones, pilot tones, or additional repetitions of the block coded bits, as described above.

In some embodiments, the PHY processor 200 encodes a plurality of information bits with a maximum number of information bits using i) a forward error correction scheme to obtain coded information bits, ii) a block coding scheme to obtain block coded bits from the coded information bits, and iii) a puncturing scheme to obtain punctured bits from the block coded bits.

In an embodiment, the punctured bits fit within a single OFDM symbol on the communication channel. The maximum number of information bits is based on a base number of repetitions of the coded information bits by the block coding scheme, in an embodiment. As a result of the puncturing, at least some of the information bits corresponding to the punctured bits have a different number of repetitions (i.e., a number of repetitions different from the base number of repetitions).

In an embodiment, the PHY processor 200 determines the number of data bits per symbols $N_{DBPS}$ according to:

$$N_{DBPS} = \left\lceil \frac{N_{SD} \cdot R}{n} \right\rceil = \left\lceil \frac{N_{SD}}{2n} \right\rceil \quad \text{(Equation 6)}$$

where $\lceil \ \rceil$ represents the integer ceiling function. In this embodiment, the data bits $N_{DBPS}$ are encoded by the FEC encoder 406 using the 1/2 rate (i.e., MCS0 where R=1/2) to obtain a number $2 \cdot N_{DBPS}$ encoded bits. The $2 \cdot N_{DBPS}$ encoded bits are repeated by the block encoder 408 to obtain the n repetitions. This results in a number of surplus bits $N_{SB}$ (i.e., of the block coded bits) that will not fit within the OFDM symbol. For example, the block coded bits include the punctured bits and a number of surplus bits to be punctured by the puncturing scheme. More specifically, the number of data tones $N_{SD}$ is less than the number of block coded bits $2 \cdot n \cdot N_{DBPS}$ (where R=1/2), thus the number of surplus bits $N_{SB}$ is computed as:

$$N_{SB} = 2 \cdot n \cdot N_{DBPS} - N_{SD} \quad \text{(Equation 7)}$$

The surplus bits are punctured from the output of the block encoder 408 to obtain the punctured bits, in various embodiments. In an embodiment, the number of surplus bits $N_{SB}$ are punctured from the block encoded bits that correspond to the $2 \cdot n \cdot N_{DBPS} - N_{SD}$ bits. In other words, the surplus bits are consecutive and positioned at an end of the block coded bits. In another embodiment, the number of surplus bits $N_{SB}$ are punctured from any of the $2 \cdot n \cdot N_{DBPS}$ block encoded bits. In other words, the surplus bits are interleaved with the punctured bits. In an embodiment, the position of the encoded bits to be punctured is predetermined, for example, set by an operator of the WLAN 10. In other embodiments, the positions of the encoded bits to be punctured are selected arbitrarily.

In an embodiment, for example, a communication channel has a 20 MHz bandwidth, a number of data tones $N_{SD}$=234, and a base number of repetitions n=2. In this embodiment, the maximum number of data bits per symbol $N_{DBPS}$ is equal to the integer ceiling of 234/2×2=59 information bits. The FEC encoder 406 generates 118 coded information bits from the 59 information bits. An intermediate output $C_{out}$ within the block encoder 408 is given by:

$$C_{out} = [[C_1, C_2, \ldots C_{118}], [C_1, C_2, \ldots C_{118}] \oplus s_1] \quad \text{(Equation 8)}$$

where $\oplus$ indicates an "exclusive or" operation, and $s_1$ is a suitable bit flipping sequence. In this embodiment, the block encoder 408 punctures two bits $C_i$ and $C_j$ from the output $C_{out}$ where the indices i and j are selected from between 1 and 118.

Figure 7:
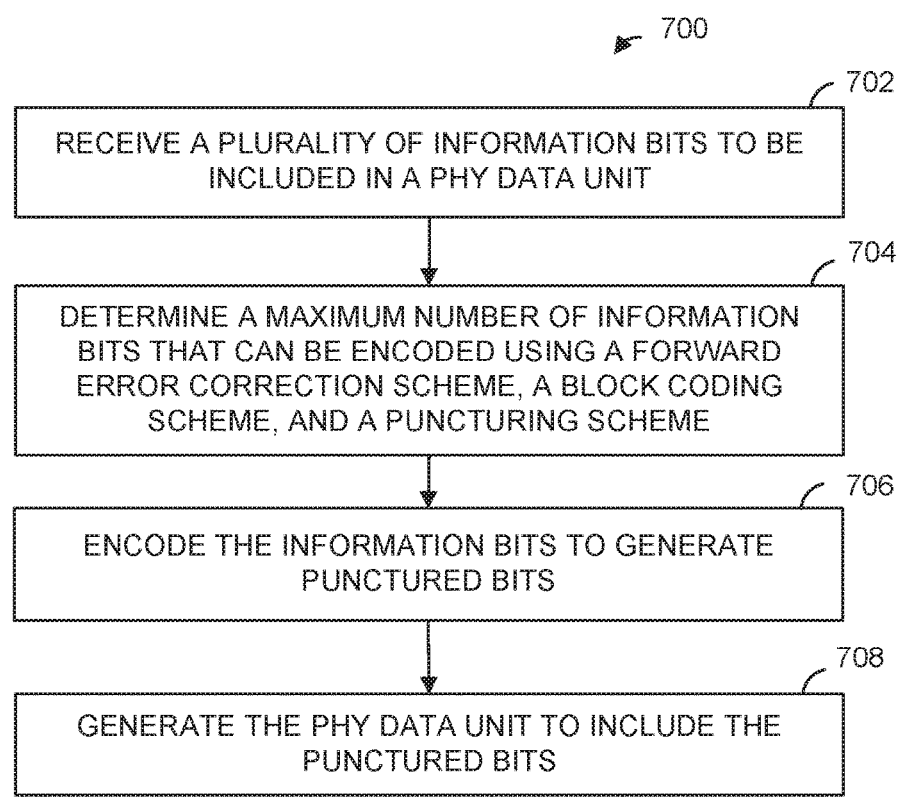
FIG. 7 is a flow diagram illustrating an example method 700 for generating a PHY data unit for transmission by a communication device via a communication channel, according to another embodiment.

FIG. 7 is a flow diagram illustrating an example method 700 for generating a PHY data unit for transmission by a communication device via a communication channel, according to another embodiment. In an embodiment, the method 700 is implemented by a client station in the WLAN, according to an embodiment. With reference to FIG. 1, the method 700 is implemented by the network interface 27, in an embodiment. For example, in one such embodiment, the PHY processor 29 is configured to implement the method 700. With continued reference to FIG. 1, in yet another embodiment, the method 700 is implemented by the network interface 16 (e.g., the PHY processor 20). In other embodiments, the method 700 is implemented by other suitable network interfaces.

At block 702, a plurality of information bits to be included in the PHY data unit are received. In an embodiment, the plurality of information bits correspond to a signal field of the PHY data unit, for example, the HEW-LTF 512 field or HEW-SIGB field 514 of the data unit 500. In an embodiment, the plurality of information bits correspond to a data field of the PHY data unit, for example, the data field 516 of the data unit 500.

At block 704, a maximum number of information bits is determined where the maximum number can be encoded such that, after the plurality of information bits have been encoded using i) a forward error correction scheme to obtain coded information bits, ii) a block coding scheme to obtain block coded bits from the coded information bits with a base number of repetitions, and iii) a puncturing scheme to obtain punctured bits from the block coded bits, the punctured bits fit within a single orthogonal frequency division multiplex (OFDM) symbol on the communication channel. The maximum number of information bits is based on a number of repetitions of the coded information bits by the block coding scheme, in an embodiment. At least some of the plurality of information bits corresponding to the punctured bits have a different number of repetitions, in an embodiment. In an embodiment, the maximum number of information bits is determined according to Equation 6 as described above. In an embodiment, the block coded bits include the punctured bits and a number of surplus bits to be punctured by the puncturing scheme.

At block 706, the plurality of information bits is encoded with the maximum number of information bits using the forward error correction scheme, the block coding scheme, and the puncturing scheme to generate the punctured bits. In an embodiment, the surplus bits are consecutive and positioned at an end of the block coded bits. In another embodiment, the surplus bits are interleaved with the punctured bits.

At block 708, the PHY data unit is generated to include the punctured bits in the single OFDM symbol.

In some embodiments, the PHY processor 200 encodes a plurality of information bits with a maximum number of information bits using i) a forward error correction scheme to obtain coded information bits, and ii) a block coding scheme to obtain block coded bits from the coded information bits. The maximum number of information bits is based on a base number of repetitions of the coded information bits by the block coding scheme, in an embodiment. In an embodiment, the maximum number of information bits $N_{DBPS}$ is not an integer, but $2 \cdot N_{DBPS}$ is an integer.

In an embodiment, the PHY processor 200 determines the number of data bits per symbols $N_{DBPS}$ according to:

$$N_{DBPS} = \frac{N_{SD} \cdot R}{n} = \frac{N_{SD}}{2n} \quad \text{(Equation 9)}$$

In this embodiment, the data bits $N_{DBPS}$ are encoded by the FEC encoder 406 using the 1/2 rate (i.e., MCS0 where R=1/2) to obtain a number $2 \cdot N_{DBPS}$ encoded bits. The $2 \cdot N_{DBPS}$ encoded bits are repeated by the block encoder 408 to obtain the n repetitions. In this embodiment, for a last symbol of the plurality of information bits, the PHY processor 200 pads the coded information bits to obtain the integer number $2 \cdot N_{DBPS}$ before the repetitions by the block encoder 408. In an embodiment, such as for a multi-user frame or OFDMA data unit, the PHY processor 200 pads the block coded bits from the block encoder 408 for the last symbol to fill a last OFDM symbol.

Figure 8:
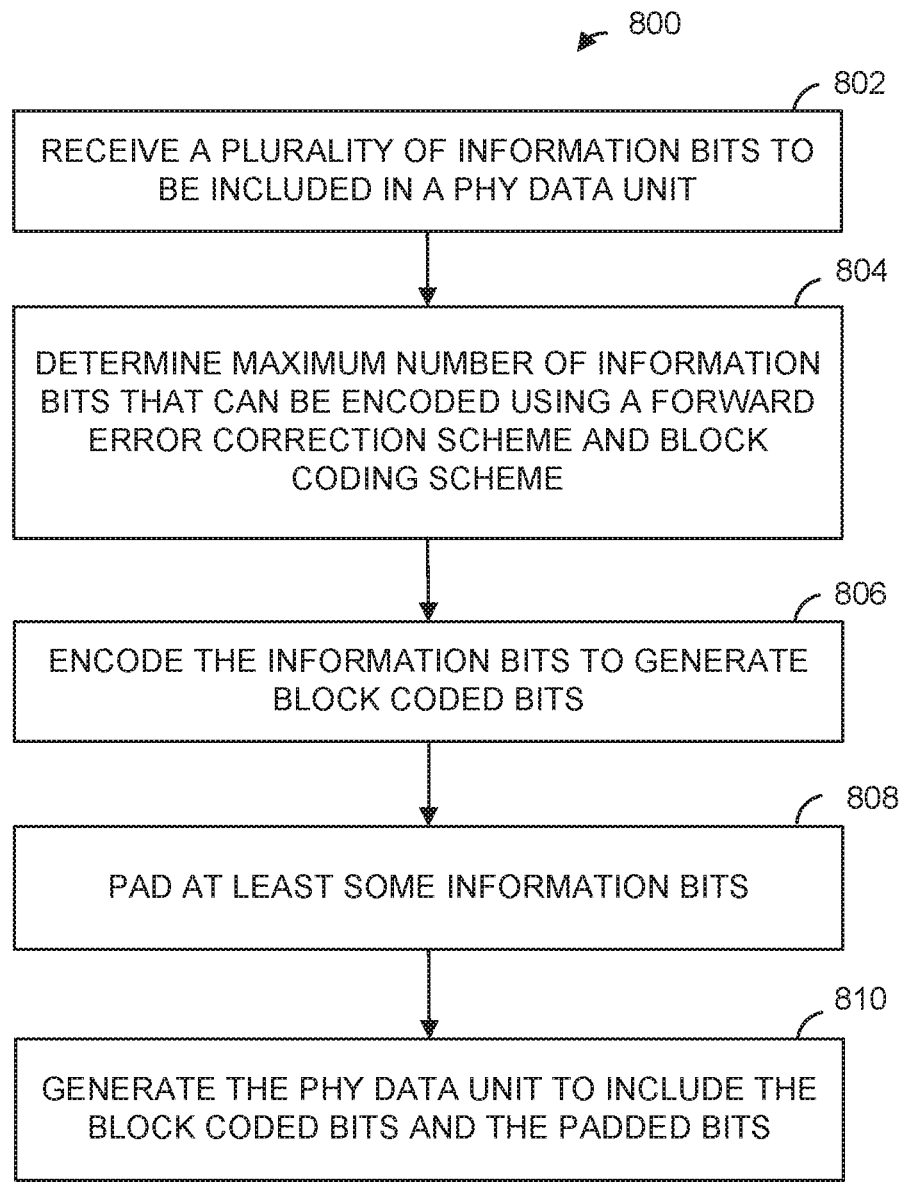
FIG. 8 is a flow diagram illustrating an example method for generating a PHY data unit for transmission by a communication device via a communication channel, according to yet another embodiment.

FIG. 8 is a flow diagram illustrating an example method 800 for generating a PHY data unit for transmission by a communication device via a communication channel, according to yet another embodiment. In an embodiment, the method 800 is implemented by a client station in the WLAN, according to an embodiment. With reference to FIG. 1, the method 800 is implemented by the network interface 27, in an embodiment. For example, in one such embodiment, the PHY processor 29 is configured to implement the method 800. With continued reference to FIG. 1, in yet another embodiment, the method 800 is implemented by the network interface 16 (e.g., the PHY processor 20). In other embodiments, the method 800 is implemented by other suitable network interfaces.

At block 802, a plurality of information bits to be included in the PHY data unit are received. In an embodiment, the plurality of information bits correspond to a signal field of the PHY data unit, for example, the HEW-LTF 512 field or HEW-SIGB field 514 of the data unit 500. In an embodiment, the plurality of information bits correspond to a data field of the PHY data unit, for example, the data field 516 of the data unit 500.

At block 804, a maximum number of information bits is determined where the maximum number can be encoded such that, after the plurality of information bits have been encoded using i) a forward error correction scheme to obtain coded information bits, and ii) a block coding scheme to obtain block coded bits from the coded information bits. The maximum number of information bits is based on a base number of repetitions of the coded information bits by the block coding scheme, in an embodiment. In an embodiment, the maximum number of information bits $N_{DBPS}$ is not an integer, but $2 \cdot N_{DBPS}$ is an integer. In an embodiment, the maximum number of information bits is determined according to Equation 9 as described above.

At block 806, the plurality of information bits is encoded with the maximum number of information bits using the forward error correction scheme and the block coding scheme to generate the block coded bits.

At block 808, the coded information bits for a last OFDM symbol of the plurality of information bits are padded with padded bits to obtain the integer number $2 \cdot N_{DBPS}$ before the repetition of the coded information bits for the last OFDM symbol.

At block 810, the PHY data unit is generated to include the block coded bits and the padded bits.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, a custom integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for generating a physical layer (PHY) data unit for transmission by a communication device via a communication channel, the method comprising:

receiving, by the communication device, a plurality of information bits to be included in the PHY data unit;

determining, by the communication device, a maximum number of information bits that can be encoded such that, after the plurality of information bits have been encoded using i) a forward error correction scheme, selected from a set of modulation and coding schemes, to obtain coded information bits, and ii) a block coding scheme to obtain block coded bits from the coded information bits, the block coded bits fit within a single orthogonal frequency division multiplex (OFDM) symbol on the communication channel, wherein the maximum number of information bits is based on a number of repetitions of the coded information bits to be generated by the block coding scheme, a number of the block coded bits for the maximum number of information bits is less than a number of data tones of the single OFDM symbol, the maximum number of information bits is determined as $$N_{DBPS} = \left\lfloor \frac{N_{SD} \cdot R}{n} \right\rfloor$$

with $N_{DBPS}$ as the maximum number of information bits, $N_{SD}$ as the number of data tones of the single OFDM symbol, R as a coding rate of the forward error correction scheme, and n as the number of repetitions of the coded information bits where $\lfloor \ \rfloor$ represents the integer floor function, and the number of the block coded bits is determined as $n \cdot N_{DBPS}/R$;

encoding, by the communication device, the plurality of information bits with the maximum number of information bits using the forward error correction scheme to generate the coded information bits and the block coding scheme to generate the block coded bits; and generating, by the communication device, the PHY data unit to include the block coded bits in the single OFDM symbol.

2. The method of claim 1, wherein:

a number of unused data tones of the single OFDM symbol is equal to a difference between the number of data tones of the single OFDM symbol and the number of the block coded bits for the maximum number of information bits.

3. The method of claim 2, wherein generating the PHY data unit comprises filling the number of unused data tones with padded bits.

4. The method of claim 2, wherein generating the PHY data unit comprises filling the number of unused data tones with edge tones.

5. The method of claim 2, wherein generating the PHY data unit comprises filling the number of unused data tones with direct current tones.

6. The method of claim 2, wherein generating the PHY data unit comprises filling the number of unused data tones with pilot tones.

7. The method of claim 2, wherein generating the PHY data unit comprises leaving the number of unused data tones empty.

8. The method of claim 2, wherein generating the PHY data unit comprises filling the number of unused data tones with additional repetitions of the block coded bits.

9. A communication device comprising:

a network interface device having one or more integrated circuits configured to:

receive a plurality of information bits to be included in the PHY data unit, determine a maximum number of information bits that can be encoded such that, after the plurality of information bits have been encoded using i) a forward error correction scheme, selected from a set of modulation and coding schemes, to obtain coded information bits, and ii) a block coding scheme to obtain block coded bits from the coded information bits, the block coded bits fit within a single orthogonal frequency division multiplex (OFDM) symbol on the communication channel, wherein the maximum number of information bits is based on a number of repetitions of the coded information bits by the block coding scheme, a number of the block coded bits for the maximum number of information bits is less than a number of data tones of the single OFDM symbol, the maximum number of information bits is determined as $$N_{DBPS} = \left\lfloor \frac{N_{SD} \cdot R}{n} \right\rfloor$$

with $N_{DBPS}$ as the maximum number of information bits, $N_{SD}$ as the number of data tones of the single OFDM symbol, R as a coding rate of the forward error correction scheme, and n as the number of repetitions of the coded information bits where $\lfloor \ \rfloor$ represents the integer floor function, and the number of the block coded bits is determined as $n \cdot N_{DBPS}/R$, encode the plurality of information bits with the maximum number of information bits using the forward error correction scheme and the block coding scheme to generate the block coded bits, and generate the PHY data unit to include the block coded bits in the single OFDM symbol.

10. The communication device of claim 9, wherein:

a number of unused data tones of the single OFDM symbol is equal to a difference between the number of data tones of the single OFDM symbol and the number of the block coded bits for the maximum number of information bits.

11. The communication device of claim 10, wherein the one or more integrated circuits are configured to fill the number of unused data tones with padded bits.

12. The communication device of claim 10, wherein the one or more integrated circuits are configured to fill the number of unused data tones with one or more of edge tones, direct current tones, or pilot tones.

13. The communication device of claim 10, wherein the one or more integrated circuits are configured to fill the number of unused data tones with additional repetitions of the block coded bits.

14. A method for generating a physical layer (PHY) data unit for transmission by a communication device via a communication channel, the method comprising:

receiving, by the communication device, a plurality of information bits to be included in the PHY data unit;
determining, by the communication device, a maximum number of information bits that can be encoded such that, after the plurality of information bits have been encoded using i) a forward error correction scheme, selected from a set of modulation and coding schemes, to obtain coded information bits, ii) a block coding scheme to obtain block coded bits from the coded information bits with a base number of repetitions, and iii) a puncturing scheme to obtain punctured bits from the block coded bits, the punctured bits fit within a single orthogonal frequency division multiplex (OFDM) symbol on the communication channel, wherein the maximum number of information bits is based on a number of repetitions of the coded information bits by the block coding scheme, at least some of the plurality of information bits corresponding to the punctured bits have a different number of repetitions, the maximum number of information bits is determined as $$N_{DBPS} = \left\lceil \frac{N_{SD} \cdot R}{n} \right\rceil$$

with $N_{DBPS}$ as the maximum number of information bits, $N_{SD}$ as the number of data tones of the single OFDM symbol, R as a coding rate of the forward error correction scheme, and n as the number of repetitions of the coded information bits where $\lceil\ \rceil$ represents the integer ceiling function, and the number of the block coded bits is determined as $n \cdot N_{DBPS}/R$;

encoding, by the communication device, the plurality of information bits with the maximum number of information bits using the forward error correction scheme, the block coding scheme, and the puncturing scheme to generate the punctured bits; and generating, by the communication device, the PHY data unit to include the punctured bits in the single OFDM symbol.

15. The method of claim 14, wherein:
the block coded bits include the punctured bits and a number of surplus bits to be punctured by the puncturing scheme;
the number of surplus bits is equal to a difference between a number of the block coded bits for the maximum number of information bits and a number of data tones of the single OFDM symbol.

16. The method of claim 15, wherein the surplus bits are consecutive and positioned at an end of the block coded bits.

17. The method of claim 15, wherein the surplus bits are interleaved with the punctured bits.

18. A communication device comprising:
a network interface device having one or more integrated circuits configured to:
receive a plurality of information bits to be included in the PHY data unit;
determine a maximum number of information bits that can be encoded such that, after the plurality of information bits have been encoded using i) a forward error correction scheme, selected from a set of modulation and coding schemes, to obtain coded information bits, ii) a block coding scheme to obtain block coded bits from the coded information bits with a base number of repetitions, and iii) a puncturing scheme to obtain punctured bits from the block coded bits, the punctured bits fit within a single orthogonal frequency division multiplex (OFDM) symbol on the communication channel, wherein the maximum number of information bits is based on a number of repetitions of the coded information bits by the block coding scheme, at least some of the plurality of information bits corresponding to the punctured bits have a different number of repetitions, the maximum number of information bits is determined as $$N_{DBPS} = \left\lceil \frac{N_{SD} \cdot R}{n} \right\rceil$$

with $N_{DBPS}$ as the maximum number of information bits, $N_{SD}$ as the number of data tones of the single OFDM symbol, R as a coding rate of the forward error correction scheme, and n as the number of repetitions of the coded information bits where $\lfloor\ \rfloor$ represents the integer ceiling function, and the number of the block coded bits is determined as $n \cdot N_{DBPS}/R$;

encode the plurality of information bits with the maximum number of information bits using the forward error correction scheme, the block coding scheme, and the puncturing scheme to generate the punctured bits; and generate the PHY data unit to include the punctured bits in the single OFDM symbol.

19. The communication device of claim 14, wherein:
the block coded bits include the punctured bits and a number of surplus bits to be punctured by the puncturing scheme;
the number of surplus bits is equal to a difference between a number of the block coded bits for the maximum number of information bits and the number of data tones of the single OFDM symbol.

20. The communication device of claim 19, wherein the surplus bits are consecutive and positioned at an end of the block coded bits.

* * * * *